Figure 1:
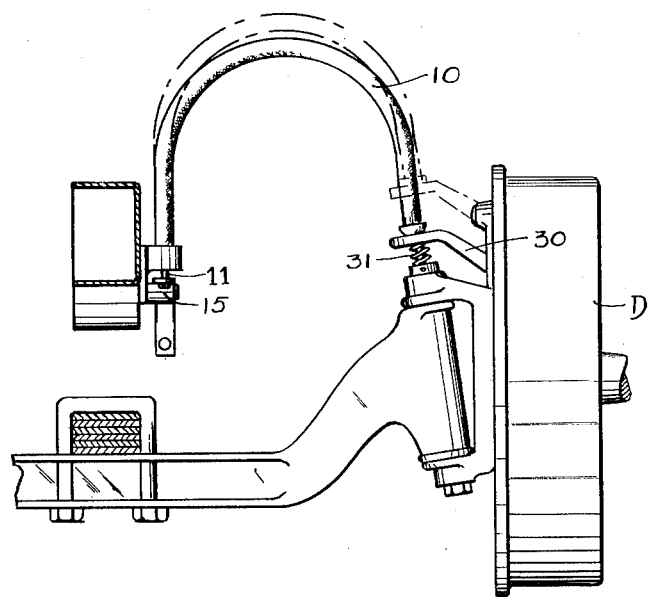

June 5, 1934.  J. SNEED  1,961,798
BRAKE CONTROL
Filed March 21, 1928  3 Sheets-Sheet 1

Inventor
John Sneed
By Bates, Macklin, Golrick & Teare
Attorneys

June 5, 1934.   J. SNEED   1,961,798
BRAKE CONTROL
Filed March 21, 1928   3 Sheets-Sheet 2
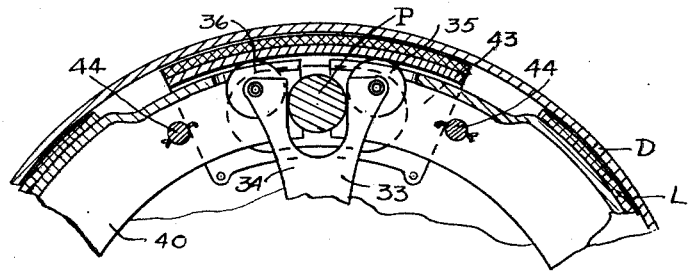
FIG.—4
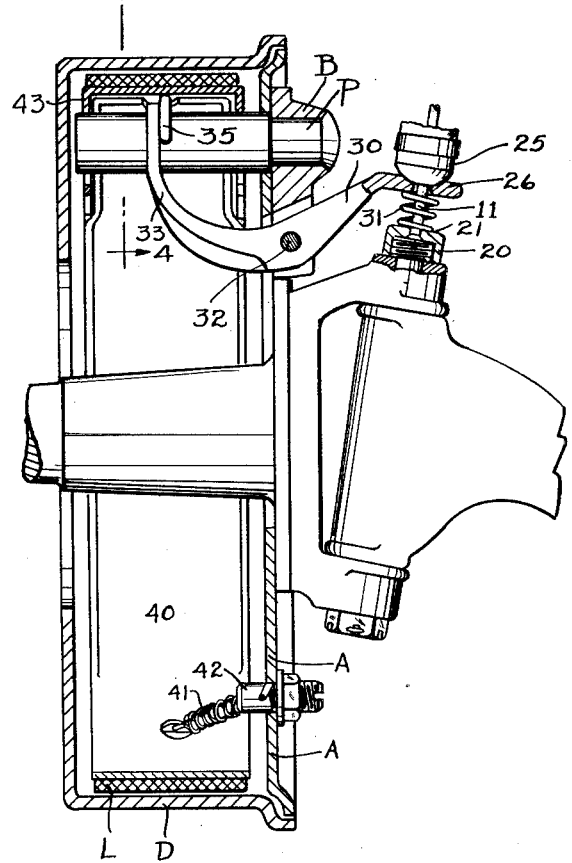
FIG.—3
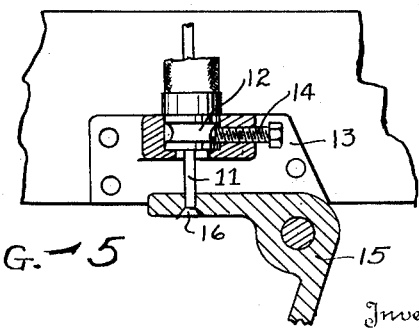
FIG.—5
Inventor
John Sneed
By Bates, Macklin, Golrick & Teare
Attorneys June 5, 1934.                J. SNEED                1,961,798
                           BRAKE CONTROL
                      Filed March 21, 1928        3 Sheets-Sheet 3

Inventor
John Sneed
By Bates, Macklin, Goluck & Teare
Attorneys

Patented June 5, 1934

1,961,798

UNITED STATES PATENT OFFICE 1,961,798

BRAKE CONTROL

John Sneed, Detroit, Mich., assignor to The Midland Steel Products Company, Cleveland, Ohio, a corporation of Ohio Application March 21, 1928, Serial No. 263,243

21 Claims. (Cl. 188—194)

This invention relates to vehicle brakes and more particularly to an operating connection for wheels which swivel with relation to the axle on which they are mounted.

It is among the objects of my invention to provide an operative connection between the frame of the vehicle and the brakes mounted on the front or swiveling wheels. I am aware that numerous devices are in use for effecting an operative connection, but my invention has among other objects, the provision of an operative connection involving a cable and a flexible conduit or housing therefor. I am aware, for instance, of United States Patent No. 1,508,195 to Sanford. However, it is among the objects of my invention to dispose at least part of the flexible force transmitting means in the swiveling axis of the wheel and to arrange that both force and motion be delivered from the flexible means to the brake in the swiveling axis. Another object is to reduce the total amount of curvature of the conduit to a minimum consistent with the foregoing objects so that the friction between the cable and the conduit will not be great. Other objects include connecting the flexible force transmitting means with the brake shoe actuating lever. This invention also has for one of its objects a disposition of parts wherein even a flexible conduit, the length of which varies when curved from a straight line, may be used. Flexible conduits of this sort are illustrated in the well known patent to Bowden, No. 609,570. It has been my experience with conduits of this type, if they are used to connect brake operating mechanism to the brake on a swiveling wheel in any manner heretofore described in the art, that when the wheel turns on its swiveling axis, the effective length of the conduit will be either increased or decreased so that different forces will be delivered to the brake, depending upon the swiveling position of the wheels. Other objects and advantages lie in the arrangement of the brake operating lever with relation to the apron, anchor and shoe.

Other objects will appear from the following detailed description of the structure illustrating a preferred embodiment of my invention. The essential characteristics are summarized in the claims.

Figure 2:
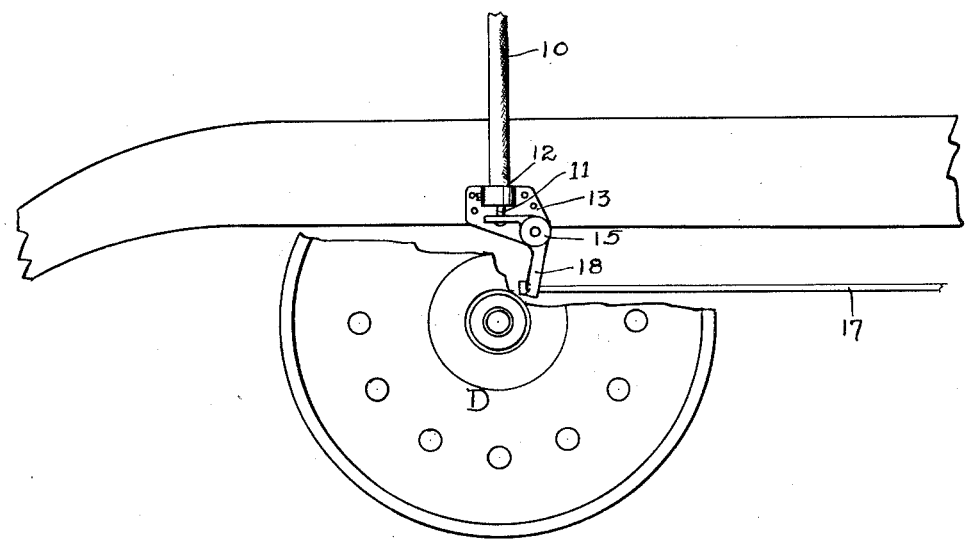
Figure 6:
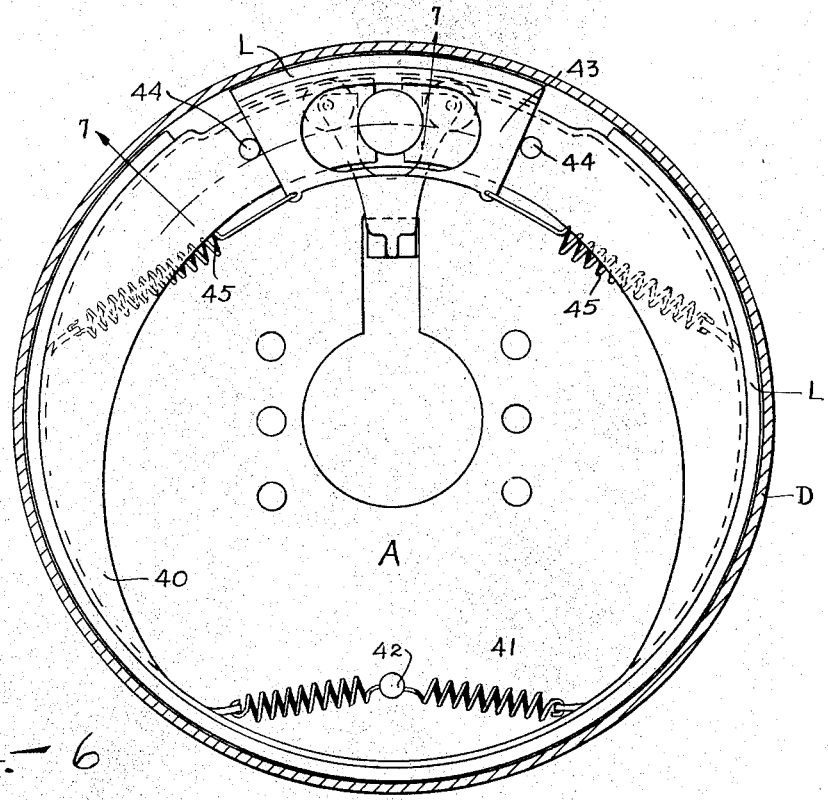
Figure 9:
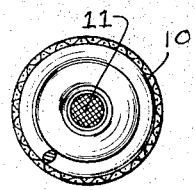
Figure 7:
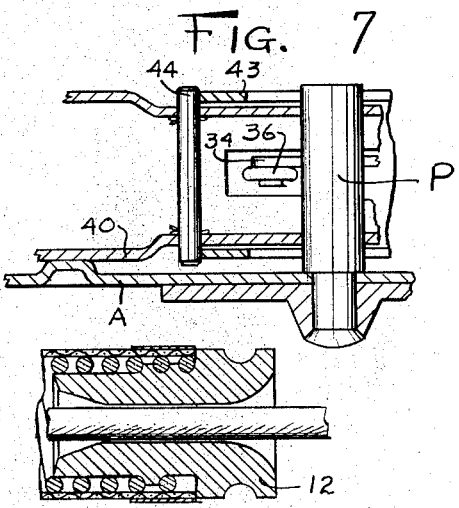
Figure 8:
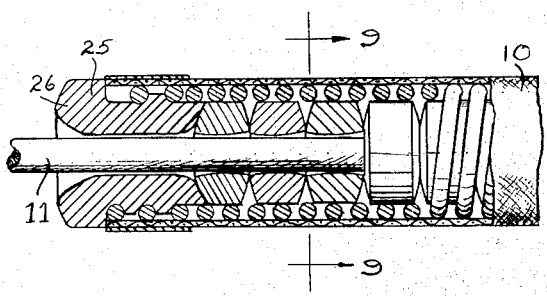

In the drawings, Fig. 1 is a front elevation including part of a vehicle axle with a brake and flexible force transmitting means; Fig. 2 is a side elevation with the brake drum partly broken, showing the operating connection; Fig. 3 is an enlarged vertical section through the brake; Fig. 4 is a section taken along the lines 4—4 of Fig. 3; Fig. 5 shows in detail the connection between the conduit and the frame of the vehicle and the connection with the brake linkage; Fig. 6 is an elevation of the shoe structure within the brake drum; and Fig. 7 is a section taken along the lines 7—7 of Fig. 6; Fig. 8 illustrates a conduit adapted for use in my invention. Fig. 9 is a section on the line 9—9 of Fig. 8.

Referring to Figs. 1 and 2, I show a conduit 10 in which is housed a cable 11 (see also Fig. 8). The conduit is positioned in substantially the vertical plane of the front axle and with that portion adjacent the axle extending in line with the swiveling axis of the wheel. Referring also to Figs. 2, 5 and 9, the conduit has an end unit 12, which is secured to the chassis frame through a suitable bracket 13 by such means as a set screw 14, as shown. The bracket 13 carries a bell crank 15 one arm of which engages the cable 11 as at 16, the other arm of which engages the brake operating rod 17 as at 18. Tension on the brake operating rod 17 passes a tension to the cable 11 which in turn is transmitted to the brake through the conduit in a manner to be described.

Referring back to Fig. 1, the conduit is shown as extending upwardly from its point of engagement with the frame and thence through a vertical curve and then downwardly in line with the swiveling axis of the wheel. Referring also to Fig. 3, it will be seen that the cable 11 extends beyond the conduit and its end 21 is held within a hollow nut 20. The nut 20 is shown to be carried by the swiveling axle or steering knuckle, but may be otherwise secured to conform to various types of axles. At this end of the conduit, a unit 25 is provided having a convex spherical surface 26 (see also Fig. 9) which rides in a concave surface of a brake operating lever 30. The cable 11 passes through the end of the lever. A spring 31 surrounding the cable urges the lever into engagement with the end member 25 of the conduit and tends to compress the conduit longitudinally.

It will be seen, particularly in Fig. 1, that in this embodiment of my invention I prefer to secure the end of the cable to the axle so that tension on the cable causes the conduit to slide along the cable and move the end 25 of the conduit downwardly. While I have shown the end 21 of the cable to be secured to a part of the axle and have shown the end 25 of the conduit to be relatively movable thereto, one skilled in the art can appreciate that the relation of these parts may be reversed within the scope of my invention and obtain the beneficial results that flow from the major precepts thereof.

The lever 30 is pivotally mounted in the apron as at 32 and is disposed to swing in a plane of the swiveling axis which lies normal to the wheel. There is thus formed a ball and socket connection in the swiveling axis of the wheel so that the swiveling of the wheel will not affect the length of the conduit and the lever 30 will be displaced equal amounts regardless of the position of the wheel.

In this embodiment, tension on the cable 11 exerted by the bell crank 15 forces the end member 25 of the conduit downwardly and rocks the lever 30 to operate the brake. As pointed out above, the swiveling of the wheel does not interrupt or vary the operation, and as illustrated in Fig. 1, relative movement between the axle and the chassis of the vehicle will not change the effective length of the conduit or the displacement of the member 30. The conduit being positioned in a generally vertical plane, has a certain proportion in curvature and a certain proportion in straight line, so that when the axle moves toward or away from the chassis the proportions will remain constant although different specific parts of the conduit and cable may deviate from their former positions. Thus there is shown in dotted lines in Fig. 1, an illustrative position of the conduit, when the axle approaches the chassis, and it will be seen that a greater portion of the conduit near the frame, tends to be in straight line whereas a lesser portion near the brake is in straight line. The sum of these portions however, remains substantially equal and, a fortiori, the proportion of the conduit in curvature remains constant. The degree of curvature also remains constant. Thus if the conduit employed were of the type in which the length changes when the proportion or degree of curvature changes, the effective length of the conduit when positioned according to my teaching, would remain constant. Neither the swiveling of the wheel nor motion between the axle and the frame varies the force or movement sought to be applied to the brake.

The brake mechanism including the shoe structure may be similar to that illustrated and described in my copending application, Serial No. 223,020, filed September 30th, 1927 for Braking device. Referring to Figs. 3, 4, 6 and 7, the structure may be briefly described as follows:

I provide a backing plate or apron A which carries a bracket B, which in turn carries an anchor pin P and provides a pivotal mounting 32 for the lever 30. A suitable brake drum D is adapted to be fixed to the wheel of the vehicle, not shown. The brake shoe 40, as illustrated, may be substantially annular having both ends engaging the anchor pin P, and may be centered in the drum by such means as the spring 41 secured to the back plate as at 42. The shoe 40 may be channeled in section except in its mid-portion, the side flanges of the channels increasing in depth toward the ends of the shoe. The ends of the shoe may be cut away to form arcuate anchor engaging surfaces as described in my copending application. The ends of the shoes are reduced in section and are nested within an auxiliary shoe. The auxiliary shoe 43 overlies the ends of the shoe 40 and engages the pins 44 carried in the ends of the shoe 40. Suitable retractor springs 45 withdraw the shoes to idle position. The inner part of the lever 30 may comprise spaced arms 33 and 34 contacting with the anchor pin and carrying rollers 35 and 36, which engage the inner side of the shoe 43. In operation when the lever 30 is rocked about its pivotal axis 32, the rollers are raised to force the auxiliary shoe 43 radially into engagement with the drum. The shoe 43 is thus carried circumferentially and exerts a force through one of the pins 44, which tends to carry one end of the shoe 40 away from the anchor and into engagement with the drum (depending on the direction of drum rotation), causing a wrapping effect and consequent gripping between the shoe and the drum. Suitable brake lining L is provided for both the shoes. The brake is equally effected regardless of the direction of drum rotation.

The operation of the whole device may be summarized as follows: Tension on the brake rod 17 creates a tension on the cable 11 which causes a relative movement between the end member 25 of the conduit and the fixed end of the cable, which rocks the lever 30 about its axis at 32, raises the auxiliary shoe 43 into engagement with the drum, which in turn forces the main shoe 40 into engagement with the drum.

While I have illustrated and described a preferred embodiment of my invention, I do not care to be limited in the scope thereof other than by the claims appended hereto.

I claim:

1. In a fore-wheel brake for automobiles, the combination of a steering knuckle carrying a front wheel, an axle upon which the knuckle is mounted to swivel on a substantially vertical axis, a frame supported by the axle, brake mechanism carried by the knuckle, brake operating mechanism carried by the frame for applying the brake at will, and means connected with the brake operating mechanism, including a cable having one end attached to the knuckle in a position substantially in line with the axis of the knuckle and having a flexible conduit extending from said end and connected with the frame so that between the conduit and cable a force is exerted in a direction substantially in line with the swiveling axis of the knuckle, said conduit being also supported on the frame and disposed in a loop in a substantially vertical plane.

2. In a fore-wheel brake for automobiles, the combination of a steering knuckle carrying a front wheel, an axle upon which the knuckle is mounted to swivel on a substantially vertical axis, a frame supported by the axle, brake mechanism carried by the knuckle, means for normally holding the brake released, brake operating mechanism carried by the frame for applying the brake at will, and means connected with the brake operating mechanism, including a flexible conduit having a movable end adjacent the knuckle substantially in line with the axis of the knuckle and having a pull wire fixed at said end and connected with the brake operating mechanism at the other end.

3. In a fore-wheel brake apparatus, the combination of a frame having side bars, a front axle supporting the frame, a steering knuckle mounted on the axle so as to swivel about a substantially vertical axis, a front wheel carried by the steering knuckle, brake mechanism associated with the wheel and including a brake drum fixed to the wheel, friction means supported on the knuckle to cooperate with the drum, a lever having engagement with the friction means and disposed in the plane of the knuckle and its swiveling axis, means for normally holding the brake band released, a flexible conduit having its upper portion disposed in a loop in substantially the vertical plane of the axle with its end engaging said lever, said conduit having its inner end secured to the adjacent side bar of the frame, brake operating mechanism carried by the frame, a flexible pull wire within the conduit connected at one end to the brake operating mechanism and with its other end extending from the flexible conduit and connected to said knuckle, so as to exert its pull in a direction substantially in line with the axis of rotation of the knuckle.

4. A brake operating connection extending from a vehicle frame to a brake on a swiveling wheel including a flexible conduit secured to the frame at one end and connected to a brake applying device at the other end and disposed wholly in the vertical plane of the vehicle axle.

5. A brake operating connection extending from a vehicle frame to a brake on a swiveling wheel including a conduit with a cable passing therethrough secured to the frame at one end and connected to an operating part of the brake at the other end and disposed in the vertical plane of the vehicle axle and lying in part in an extension of the swiveling axis of the wheel.

6. The combination of a vehicle having a sprung part and an unsprung part, a wheel swiveled on the unsprung part, a brake for said wheel, means for operating the brake including a flexible conduit with a cable passing therethrough associated at its ends with the sprung and unsprung parts of the vehicle respectively, the portion of the conduit associated with the unsprung part of the vehicle being disposed substantially in the swiveled axis of the wheel and connected to an operating part of the brake.

7. The combination of a vehicle having a sprung part and an unsprung part, a wheel swiveled on the unsprung part, a brake for said wheel, means for operating the brake including a flexible conduit with a cable passing therethrough associated at its ends with the sprung and unsprung parts of the vehicle, respectively and being wholly disposed in the vertical plane of the unsprung part.

8. In a vehicle having a wheel mounted on a knuckle to swivel on an axle, a brake for said wheel, and operating connections for said brake including a flexible conduit having a part at its end formed with a substantially spherical surface generated from a point located in the line of the swiveling axis of the wheel, a rockable member having a surface complementary to and cooperating with said part and lying in a plane normal to the wheel and including the swiveling axis and a cable passing through the conduit and secured to said knuckle.

9. Brake operating mechanism for a vehicle having a sprung part and an unsprung part including an axle and a swiveling wheel with a brake, comprising a flexible conduit secured at one end to the sprung part and a cable housed in the conduit and secured to the axle.

10. Brake operating mechanism for a vehicle having a sprung part and an unsprung part including a swiveling wheel with a brake, comprising a flexible conduit having one end secured to the sprung part and its other end free and a cable housed within the conduit and secured to the unsprung part at one end.

11. Brake operating mechanism for a vehicle having a sprung part and an unsprung part including a wheel with a brake, comprising a flexible conduit secured at one end to the sprung part and having its other end movable to actuate the brake, a cable housed within the conduit, and brake operating means carried by the sprung part and connected to said cable.

12. In a vehicle having a sprung part and an unsprung part including a swiveling wheel carrying a brake, brake operating means including connections from the sprung part to the unsprung part comprising a lever carried by the brake and having one end extending into the swiveling axis of the wheel, a cable secured to the unsprung part in the said swiveling axis and a member movable coaxially of said cable and engaging said lever.

13. In a vehicle having a frame carrying brake linkage including a brake rod, an axle having a wheel swiveled thereon, and a brake for the wheel, the combination of a lever carried by the brake, a bell crank carried by the frame and connected to said brake rod, and flexible force transmitting means connecting said lever and said bell crank, said flexible force transmitting means including a flexible conduit and a cable housed therein, said conduit being connected to said lever at one end of said means and said cable being connected to said bell crank at the other end of said means.

14. In a vehicle the combination of a frame carrying brake linkage including a brake rod, an axle having a wheel swiveled thereon, a brake for the wheel, a lever carried by the brake and having one end in the swiveling axis of the wheel, a bell crank carried by the frame and connected to said brake rod, and flexible force transmitting means secured to the frame and to the axle and connected to the bell crank and to said lever in the plane of said swiveling axis, said means comprising a cable housed in a flexible conduit, the cable being connected to the bell crank and the conduit being connected to said lever.

15. In a brake for vehicle having a frame and a swiveling wheel having a drum, an apron, an anchor carried by the apron, a lever pivotally mounted on the apron on an axis transverse to the axis of the anchor and having a part extending past the anchor toward the drum and another part extending past the apron into the swiveling axis of the wheel and means moving in the said swiveling axis for rocking said lever, said means including a flexible conduit secured at one end to the frame of the vehicle and connected to said lever at the other end.

16. Brake operating mechanism for a vehicle having a sprung part including brake operating means carried thereby and an unsprung part including a swiveling wheel with a brake a lever connected to said brake and having a concave seat at one end thereof, said mechanism comprising a flexible conduit secured at one end to the sprung part and having a spherical part seating in said concaved portion of said lever, said conduit extending in a curve and having its other end movable to actuate the brake a center portion of said conduit lying in a plane above the ends thereof, and a cable housed within the conduit having one end connected to the unsprung part adjacent the movable end of the conduit and having its other end connected to said operating means adjacent the fixed end of the conduit.

17. Brake operating mechanism for a vehicle having a sprung part carrying brake operating means and an unsprung part including a wheel with a brake, said operating mechanism comprising a flexible conduit secured at one end to the sprung part and extending in a curve to the brake and extending vertically adjacent the brake and having its end adjacent the brake movable to actuate the brake, and a cable housed within the conduit connected at one end adjacent the brake and adjacent the movable end of the conduit and connected at its other end adjacent the fixed end of the conduit to said brake operating means.

18. In a fore-wheel brake for automotive vehicles, the combination of a frame, an axle supporting said frame, a steering knuckle mounted on the axle so as to swivel about a vertical axis, a wheel mounted on said axis, a brake drum mounted on said wheel, a brake shoe within said brake drum and adapted to be expanded thereagainst, means for operating said brake shoe, said means including a flexible force transmitting device comprising a flexible conduit and a cable extending therethrough, the conduit being connected at one end to the frame, a movable part associated with the brake shoe, the other end of said conduit being connected to said movable part, a cable extending through said conduit and connected to the steering knuckle, both the cable and the conduit being arranged in a curve whereby tension exerted on the cable causes said conduit to move said movable part to apply the brake.

19. A brake operating connection extending from a vehicle frame to a brake on a swiveling wheel which includes a flexible conduit secured to the frame at one end and connected to a brake applying device at the other end, said brake applying device including a lever mounted on an axis normal to the vertical plane of the vehicle axle.

20. A brake operating connection extending from a vehicle frame to a brake on a swiveling wheel, said brake comprising a main shoe and an auxiliary shoe, said brake operating means including a conduit with a cable passing therethrough secured to the frame at one end and operatively associated with said auxiliary shoe at the other end and disposed in a vertical plane to the vehicle axle and lying in part in an extension of the swiveling axis of the wheel.

21. A brake operating connection extending from a vehicle frame to a brake on a swivelling wheel, said brake comprising the main shoe and an auxiliary shoe, means for automatically returning the auxiliary shoe to release position, said brake operating means including a conduit with a cable passing therethrough secured to the frame at one end and operatively associated with said auxiliary shoe at the other end and disposed in a vertical plane to the vehicle axle and lying in part in an extension of the swivelling axis of the wheel.

JOHN SNEED.